(12) United States Patent  
Gorfu

(10) Patent No.: US 6,249,987 B1
(45) Date of Patent: Jun. 26, 2001

(54) DISTANCE MEASURING DEVICE

(76) Inventor: Iasu Gorfu, 9852 Stanford Ave., Garden Grove, CA (US) 92841

( * ) Notice: Subject to any disclaimer, the term of this patent is extended or adjusted under 35 U.S.C. 154(b) by 0 days.

(21) Appl. No.: 09/262,210

(22) Filed: Mar. 4, 1999

(51) Int. Cl.[7] .................................................. G01B 3/12
(52) U.S. Cl. .................................. 33/781; 33/772; 33/780
(58) Field of Search ................................ 33/772, 533, 781, 33/780, 782, 779, 773, 774, 775, 711, 734, 746–749

(56) References Cited

U.S. PATENT DOCUMENTS

| 3,191,310 | * | 6/1965 | Carlson et al. | 33/781 |
| 3,251,132 | * | 5/1966 | Hall | 33/781 |
| 3,516,164 | * | 6/1970 | McCormick | 33/772 |
| 3,696,510 | * | 10/1972 | Evans, Jr. | 33/781 |
| 3,700,164 | * | 10/1972 | Slagle | 33/772 |
| 3,835,543 | * | 9/1974 | Polydoris | 33/781 |
| 4,176,458 | * | 12/1979 | Dunn | 33/781 |
| 4,276,695 | * | 7/1981 | Stansbury, Jr. | 33/781 |
| 4,532,710 | * | 8/1985 | Kinney et al. | 33/781 |
| 4,989,342 | * | 2/1991 | Nosek | 33/780 |
| 5,052,687 | * | 10/1991 | Katerba | 33/781 |

FOREIGN PATENT DOCUMENTS

142206 * 6/1988 (JP) ........................................ 33/772

* cited by examiner

Primary Examiner—Die Gutierrez
Assistant Examiner—Quyen Doan

(57) ABSTRACT

A distance measuring device for measuring distances between two points. The distance measuring device includes a housing having a top and a bottom. A handle is coupled to the housing. A wheel is rotatably mounted to the bottom of the housing. An electronic distance calculating means calculates and displays a distance traveled by the wheel.

6 Claims, 2 Drawing Sheets

DISTANCE MEASURING DEVICE

BACKGROUND OF THE INVENTION

1. Field of the Invention

The present invention relates to wheeled distance measuring devices and more particularly pertains to a new distance measuring device for measuring distances between two points.

2. Description of the Prior Art

The use of wheeled distance measuring devices is known in the prior art. More specifically, wheeled distance measuring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,176,458; U.S. Pat. No. 3,918,163; U.S. Pat. No. 2,614,330; U.S. Pat. No. Des. 383,399; U.S. Pat. No. 3,516,164; and U.S. Pat. No. 4,760,647.

While these devices fulfill their respective, particular objectives and requirements, the aforementioned patents do not disclose a new distance measuring device. The inventive device includes a housing having a top and a bottom. A handle is coupled to the housing. A wheel is rotatably mounted to the bottom of the housing. An electronic distance calculating means calculates and displays a distance traveled by the wheel.

In these respects, the distance measuring device according to the present invention substantially departs from the conventional concepts and designs of the prior art, and in so doing provides an apparatus primarily developed for the purpose of measuring distances between two points.

SUMMARY OF THE INVENTION

In view of the foregoing disadvantages inherent in the known types of wheeled distance measuring devices now present in the prior art, the present invention provides a new distance measuring device construction wherein the same can be utilized for measuring distances between two points.

The general purpose of the present invention, which will be described subsequently in greater detail, is to provide a new distance measuring device apparatus and method which has many of the advantages of the wheeled distance measuring devices mentioned heretofore and many novel features that result in a new distance measuring device which is not anticipated, rendered obvious, suggested, or even implied by any of the prior art wheeled distance measuring devices, either alone or in any combination thereof.

To attain this, the present invention generally comprises a housing having a top and a bottom. A handle is coupled to the housing. A wheel is rotatably mounted to the bottom of the housing. An electronic distance calculating means calculates and displays a distance traveled by the wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new distance measuring device apparatus and method which has many of the advantages of the wheeled distance measuring devices mentioned heretofore and many novel features that result in a new distance measuring device which is not anticipated, rendered obvious, suggested, or even implied by any of the prior art wheeled distance measuring devices, either alone or in any combination thereof.

It is another object of the present invention to provide a new distance measuring device which may be easily and efficiently manufactured and marketed.

It is a further object of the present invention to provide a new distance measuring device which is of a durable and reliable construction.

An even further object of the present invention is to provide a new distance measuring device which is susceptible of a low cost of manufacture with regard to both materials and labor, and which accordingly is then susceptible of low prices of sale to the consuming public, thereby making such distance measuring device economically available to the buying public.

Still yet another object of the present invention is to provide a new distance measuring device which provides in the apparatuses and methods of the prior art some of the advantages thereof, while simultaneously overcoming some of the disadvantages normally associated therewith.

Still another object of the present invention is to provide a new distance measuring device for measuring distances between two points.

Yet another object of the present invention is to provide a new distance measuring device which includes a housing having a top and a bottom. A handle is coupled to the housing. A wheel is rotatably mounted to the bottom of the housing. An electronic distance calculating means calculates and displays a distance traveled by the wheel.

Still yet another object of the present invention is to provide a new distance measuring device that, in one embodiment, disassembles and is small enough that the head portion will fit into a pocket.

Even still another object of the present invention is to provide a new distance measuring device that has a display that displays both English and metric distances simultaneously.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
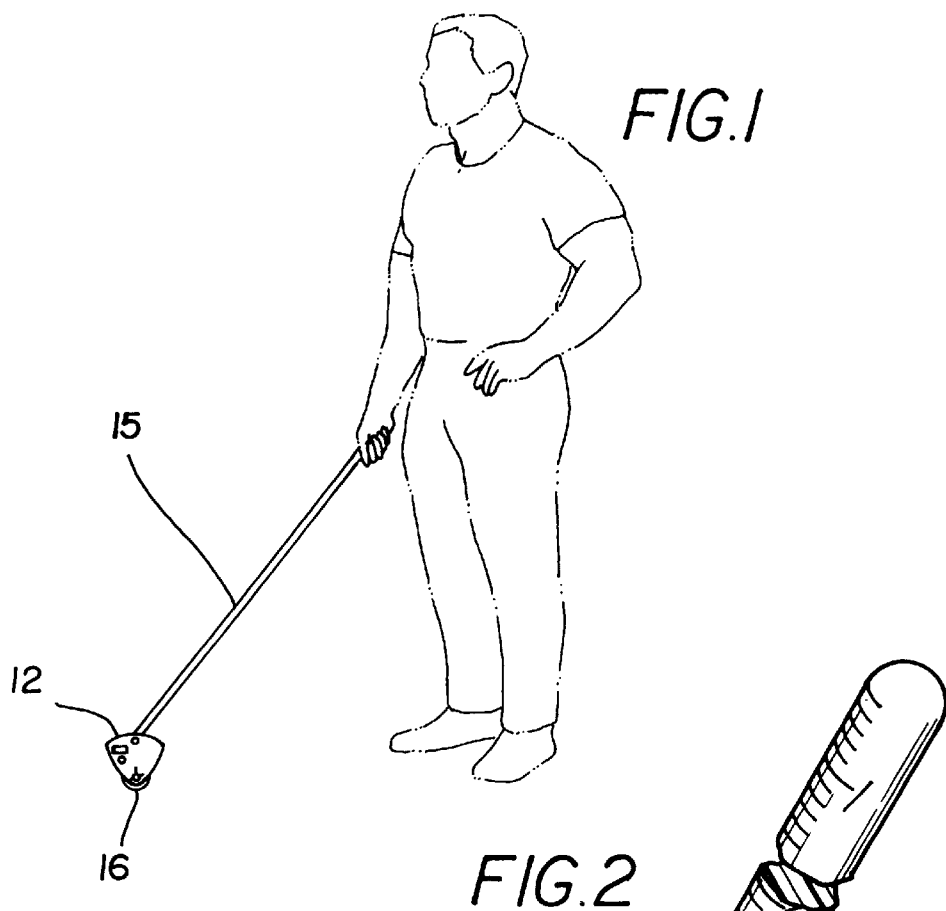
FIG. 1 is a schematic side view of a new distance measuring device according to the present invention.
Figure 2:
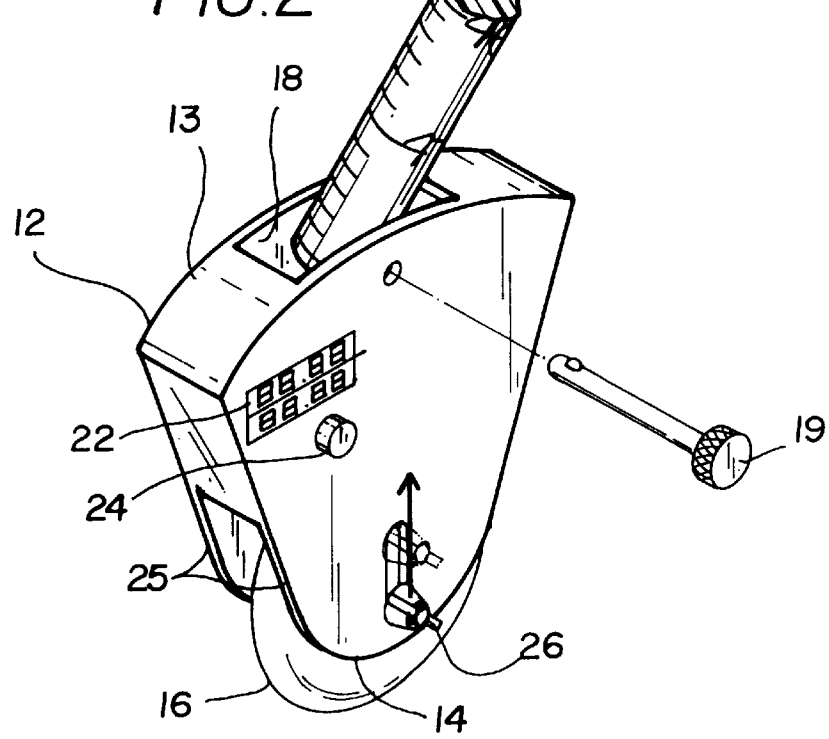
FIG. 2 is a schematic perspective view of the present invention.
Figure 3:
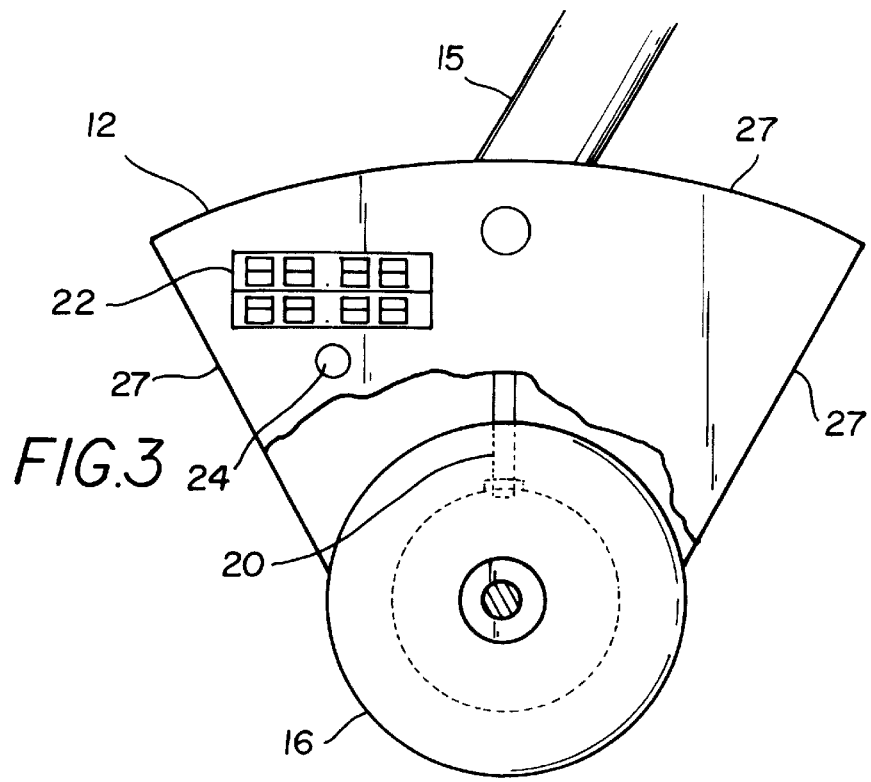
FIG. 3 is a schematic breakaway view of the present invention.
Figure 4:
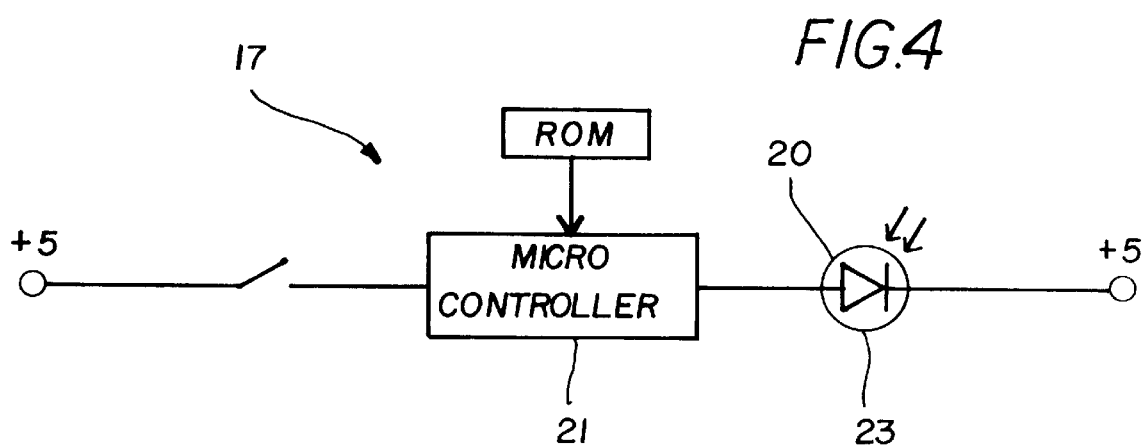
FIG. 4 is a schematic diagram of the present invention illustrating the circuitry of the device.

With reference now to the drawings, and in particular to FIGS. 1 through 4 thereof, a new distance measuring device embodying the principles and concepts of the present invention and generally designated by the reference numeral 10 will be described.

As best illustrated in FIGS. 1 through 4, the distance measuring device 10 generally comprises a housing 12 having a top 13 and a bottom 14. A handle 15 is coupled to the housing. A wheel 16 is rotatably mounted to the bottom of the housing. An electronic distance calculating means 17 calculates and displays a distance traveled by the wheel.

Ideally, the handle is inserted in a top opening 18 of the housing and is detachably and pivotally coupled to the housing by a handle retaining pin 19. The handle has calibrated indicia along its length, like the indicia on a yardstick, for measuring distances. This is particularly useful for measuring into deep, inaccessible crevasses and holes.

An electronic distance calculating means is used because it gives a more accurate reading than the traditional geared measuring wheels. Furthermore, the electronic distance calculating means is compact enough to fit into a pocket-sized housing, thus allowing this device to be dimensioned to be more portable.

Preferably, the electronic distance calculating means comprises a sensor 20 for sensing a number of revolutions of the wheel, a processor 21 in communication with the sensor for calculating a distance traveled by the wheel, and a display panel 22 in communication with the processor for displaying a distance traveled by the wheel. The preferred electronic distance calculating means is similar to the electronic odometers used in modern automobiles. A sensor diode 23 reads indicia on the wheel to measure the number of full and partial revolutions the wheel has traveled.

Another exemplary sensor includes a Reed switch (not shown). In such an embodiment, a magnet would be positioned on a portion of the wheel and would magnetically attract a portion of the switch to momentarily close the switch when the magnet passes by the switch during rotation with the wheel. A third exemplary sensor could be a switch physically closed by a protuberance on a portion of the wheel.

Preferably, the display panel has dual displays to display the distance traveled by the wheel in both English and metric units. Also preferably, the display panel has a reset button 24 for resetting a distance shown on the display panel to zero.

Preferably, the bottom of the housing has a pair of flaps 25. The wheel is rotatably mounted to the flaps. The wheel may be positionable along the flaps between an extended position and a retracted position for portability. Ideally, a portion of the wheel extends past the flaps when the wheel is in the extended position such that the wheel may engage a ground surface. The wheel is positioned completely between the flaps when the wheel is in the retracted position, used primarily for storing the housing in a compact state. The wheel may have a tightening cap 26 on one end of the wheel's axle to hold the wheel in the desired position, or the wheel may be frictionally held in place until sufficient force is exerted against it to move it between the extended and retracted positions.

An exemplary shape of the housing is shown in the Figures and has three sides 27 each about 2 inch long. In such an embodiment, the preferred width of the housing between front and back faces is about ½ inch.

In use, the handle is attached to the housing and the wheel is placed in the extended position. The handle is used to roll the wheel along the ground. The electronic distance calculating means computes and displays the distance traveled by the wheel.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A distance measuring device, comprising:

a housing having a top and a bottom and an interior;

a handle coupled to said housing;

a wheel being rotatably mounted to said bottom of said housing;

an electronic distance calculating means for calculating and displaying a distance traveled by said wheel, said distance calculating mean being operatively coupled to said wheel;

wherein said bottom of said housing has a pair of flaps extending therefrom, said wheel being rotatably mounted on said flaps; and wherein said wheel is movable between said flaps, said wheel having an extended position wherein a portion of said wheel extends beyond a perimeter edge of each of said flaps such that said wheel is capable of engaging a ground surface for rotating said wheel, said wheel having a retracted position wherein said wheel is moved upward into the interior of said housing relative to said extended position for protecting said wheel during periods of non-use.

2. The distance measuring device of claim 1, wherein said handle has calibrated indicia therealong for measuring distances.

3. The distance measuring device of claim 1, wherein said electronic distance calculating means comprises a sensor for sensing a number of revolutions of said wheel, a processor in communication with said sensor for calculating a distance traveled by said wheel, and a display panel in communication with said processor for displaying a distance traveled by said wheel.

4. The distance measuring device of claim 3, wherein said display panel displays the distance traveled by said wheel in both English and metric units.

5. The distance measuring device of claim 3, wherein said display panel has a reset button for resetting a distance shown on said display panel to zero.

6. A distance measuring device, comprising:

a housing having a top and a bottom;

a handle coupled to said top of said housing;

said handle having calibrated indicia therealong for measuring distances;

a wheel being rotatably mounted to said bottom of said housing;

an electronic distance calculating means for calculating and displaying a distance traveled by said wheel, said means being operatively coupled to said wheel;

wherein said electronic distance calculating means comprises a sensor for sensing a number of revolutions of said wheel, a processor in communication with said sensor for calculating a distance traveled by said wheel, and a display panel in communication with said processor for displaying a distance traveled by said wheel;

wherein said display panel displays the distance traveled by said wheel in both English and metric units;

wherein said display panel has a reset button for resetting a distance shown on said display panel to zero;

said bottom of said housing having a pair of flaps, said wheel being rotatably mounted to said flaps; and wherein said wheel is positionable along said flaps between an extended position and a retracted position, a portion of said wheel extending past said flaps when said wheel is in said extended position such that said wheel may engage a ground surface, said wheel being positioned completely between said flaps when said wheel is in said retracted position.

* * * * *